US010871976B2

(12) United States Patent
Yi et al.

(10) Patent No.: US 10,871,976 B2
(45) Date of Patent: Dec. 22, 2020

(54) METHOD AND APPARATUS FOR IDENTIFYING HOTSPOT INTERMEDIATE CODE IN LANGUAGE VIRTUAL MACHINE

(71) Applicant: HUAWEI TECHNOLOGIES CO., LTD., Guangdong (CN)

(72) Inventors: Mingliang Yi, Hangzhou (CN); Long Chen, Beijing (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 0 days.

(21) Appl. No.: 15/995,555

(22) Filed: Jun. 1, 2018

(65) Prior Publication Data

US 2018/0276015 A1 Sep. 27, 2018

Related U.S. Application Data

(63) Continuation of application No. PCT/CN2016/096068, filed on Aug. 19, 2016.

(30) Foreign Application Priority Data

Dec. 2, 2015 (CN) .......................... 2015 1 0872247

(51) Int. Cl.
G06F 9/455 (2018.01)
(52) U.S. Cl.
CPC ........ G06F 9/45508 (2013.01); G06F 9/4552 (2013.01)
(58) Field of Classification Search
CPC ........................... G06F 9/4552; G06F 9/45508
See application file for complete search history.

(56) References Cited

U.S. PATENT DOCUMENTS 5,394,537 A * 2/1995 Courts .................... G06F 12/08
711/202
6,530,075 B1 3/2003 Beadle et al.
(Continued)

FOREIGN PATENT DOCUMENTS

CN 1790267 A 6/2006
CN 101963907 A 2/2011
(Continued)

OTHER PUBLICATIONS

Santonu Sarkar et al., "Identifying Hotspots in a Program for Data Parallel Architecure", [Online], ACM-2012, pp. 131-137, [Retrieved from Internet on Jul. 30, 2019], <http://delivery.acm.org/10.1145/2140000/2134277/p131-sarkar.pdf>.*

(Continued)

Primary Examiner — Ziaul A Chowdhury

(57) ABSTRACT

The present disclosure provide a method and an apparatus for identifying hotspot intermediate code. The method for identifying hotspot intermediate code includes: when a language virtual machine executes a to-be-identified function, obtaining an instruction address in an instruction counter, and determining whether a native instruction corresponding to the instruction address is a native instruction of the to-be-identified function; when the native instruction corresponding to the instruction address is the native instruction of the to-be-identified function, increasing a current hotness value of the to-be-identified function by a preset value; and determining whether an updated hotness value of the to-be-identified function is greater than or equal to a hotness threshold of the to-be-identified function, and when the updated hotness value of the to-be-identified function is greater than or equal to the hotness threshold of the to-be-identified function, using intermediate code of the to-be-identified function as hotspot intermediate code.

22 Claims, 5 Drawing Sheets

(56) References Cited

U.S. PATENT DOCUMENTS

| | | | |
|---|---|---|---|
| 6,910,206 B1* | 6/2005 | Nevill | G06F 9/4484 717/153 |
| 7,197,573 B1* | 3/2007 | Jacobson | H04L 43/0882 370/237 |
| 7,873,814 B1* | 1/2011 | Cohen | G06F 9/4552 712/209 |
| 8,281,296 B2* | 10/2012 | Vick | G06F 9/45516 717/152 |
| 8,307,353 B2* | 11/2012 | Wright | G06F 8/4443 717/152 |
| 9,734,039 B2* | 8/2017 | Guan | G06F 11/3624 |
| 2002/0066091 A1* | 5/2002 | Larsson | G06F 9/45508 717/158 |
| 2002/0144240 A1 | 10/2002 | Lueh et al. | |
| 2003/0084432 A1 | 5/2003 | Kobayashi | |
| 2004/0073904 A1 | 4/2004 | Hill | |
| 2004/0088690 A1* | 5/2004 | Shaul | G06F 9/45516 717/154 |
| 2005/0198620 A1* | 9/2005 | Mathiske | G06F 9/5016 717/124 |
| 2007/0074171 A1 | 3/2007 | Burka et al. | |
| 2009/0150863 A1* | 6/2009 | Guo | G06F 8/437 717/116 |
| 2009/0177642 A1* | 7/2009 | Chung | G06F 11/3419 |
| 2011/0173199 A1* | 7/2011 | Heisig | G06F 11/3409 707/737 |
| 2012/0204164 A1* | 8/2012 | Castanos | G06F 8/443 717/153 |
| 2014/0310561 A1 | 10/2014 | Zhang et al. | |
| 2014/0372734 A1 | 12/2014 | Greathouse et al. | |
| 2015/0178054 A1* | 6/2015 | Delsart | G06F 8/30 717/106 |
| 2016/0188372 A1* | 6/2016 | Sarkar | G06F 9/45516 718/103 |
| 2017/0235602 A1* | 8/2017 | Li | G06F 12/08 719/320 |

FOREIGN PATENT DOCUMENTS

| | | |
|---|---|---|
| CN | 103399780 A | 11/2013 |
| CN | 103473168 A | 12/2013 |
| CN | 103729235 A | 4/2014 |
| CN | 104657496 A | 5/2015 |
| CN | 105511942 A | 4/2016 |
| CN | 105589729 A | 5/2016 |
| JP | 2005251208 A | 9/2005 |
| KR | 20040034601 A | 4/2004 |
| KR | 100943887 B1 | 2/2010 |
| KR | 20140114618 A | 9/2014 |

OTHER PUBLICATIONS

Michael Paleczny et al. "The Java HotSpotTM Server Compiler", [Online], pp. 1-12, [Retrieved from Internet on Aug. 13, 2020], <https://www.researchgate.net/profile/Cliff_Click/publication/220817735_The_Java_HotSpot_Server_Compiler/links/5978f707aca27203ecc63127/The-Java-HotSpot-Server-Compiler.pdf> (Year: 2001).*

Brian Alliet et al., "Complete Translation of Unsafe Native Code to Safe Bytecode", [Online], pp. 32-41, [Retrieved from Internet on Aug. 13, 2020], <https://dl.acm.org/doi/pdf/10.1145/1059579.1059589> (Year: 2004).*

Extended European Search Report, dated Dec. 19, 2018, in European Application No. 16869720.9 (8 pp.).

Zhang Hui zhen et al., "Configurable hardware profiler for dynamic hot path detection," Systems Engineering and Electronics, vol. 31, No. 9, Sep. 2009 (6 pp.).

Chen et al.,"Dynamic Trace Selection Using Performance Monitoring Hardware Sampling," 2003 IEEE, pp. 79-90.

Cuthbertson et al.,"A Practical Approach to Hardware Performance Monitoring based Dynamic Optimizations in a Production JVM," 2009 International Symposium on Code Generation and Optimization, 2009 IEEE, pp. 190-199.

Zheng, Hu Zuo, "Research and Application of Hotspot-tracking Technology Based on Virtual Machine JIT Mechanism", University of Electronic Science and Technology of China, dated 2014, 80 pgs.

Gartley et al., "Experiences Designing a Robust and Scalable Interpreter Profiling Framework," 2013 IBM Corporation, 27 pgs.

International Search Report dated Nov. 22, 2016 in corresponding International Patent application No. PCT/CN2016/096068, 7 pgs.

Written Opinion of the International Search Authority dated Nov. 22, 2016 in corresponding International Patent Application No. PCT/CN2016/096068, 6 pgs.

Chinese Office Action dated Apr. 25, 2018, in corresponding Chinese Patent Application No. 201510872247.7, 5 pgs.

International Search Report dated Nov. 22, 2016 in corresponding International Patent Application No. PCT/CN2016/2016/096068.

KR/10-2018-7018366, Notice of Allowance, dated Feb. 19, 2020.

* cited by examiner

METHOD AND APPARATUS FOR IDENTIFYING HOTSPOT INTERMEDIATE CODE IN LANGUAGE VIRTUAL MACHINE

CROSS-REFERENCE TO RELATED APPLICATIONS

This application is a continuation of International Application No. PCT/CN2016/096068, filed on Aug. 19, 2016, which claims priority to Chinese Patent Application No. 201510872247.7, filed on Dec. 2, 2015. The disclosures of the aforementioned applications are hereby incorporated by reference in their entireties.

TECHNICAL FIELD

The present disclosure relates to compilation technologies, and, to a method and an apparatus for identifying hotspot intermediate code.

BACKGROUND

During code execution, to shield a difference between platforms, source code first needs to be converted into intermediate code, and then the intermediate code runs on its language virtual machine. A language virtual machine is a virtual machine on which intermediate code runs. For example, a JAVA virtual machine (JVM) on which JAVA intermediate code (bytecode) is executed generally includes an interpreter (Interpreter) and a just-in-time (JIT) compiler. During intermediate code execution, the interpreter is configured to: when a program is started, one-by-one interpret and execute intermediate code, and therefore, execution efficiency is relatively low. The just-in-time compiler is configured to compile intermediate code into native code that is used to be called and executed, and execution efficiency of the native code is relatively high. Some just-in-time compilers may be further classified into a lightweight compiler and a heavyweight compiler. In comparison with the lightweight compiler, optimization methods of the heavyweight compiler are more diverse, and a compilation effect is better. However, overheads during the compilation are higher.

However, when hotspot intermediate code (frequently executed intermediate code) cannot be effectively identified, the just-in-time compiler obtains infrequently executed native code by means of compilation. The infrequently executed native code occupies a large amount of storage space. Consequently, a subsequent compilation process of frequently executed intermediate code is affected, storage space is wasted, and entire operating performance of the language virtual machine is severely affected.

SUMMARY

An objective of the present disclosure is to provide a method and an apparatus for identifying hotspot intermediate code, so as to identify hotspot intermediate code.

The foregoing objective and another objective are achieved by using characteristics in the independent claims. Further implementation manners are described in the dependent claims, the specification, and the accompanying drawings.

According to a first aspect, an apparatus for identifying hotspot intermediate code is provided, and the apparatus includes:

an obtaining circuit, configured to: when a language virtual machine executes a to-be-identified function, obtain an instruction address in an instruction counter;

a first determining circuit, configured to determine, according to the instruction address that is in the instruction counter and is obtained by the obtaining circuit, whether a native instruction corresponding to the instruction address in the instruction counter is a native instruction of the to-be-identified function;

an updating circuit, configured to: when the first determining circuit determines that the native instruction corresponding to the instruction address in the instruction counter is the native instruction of the to-be-identified function, increase a current hotness value of the to-be-identified function by a preset value, to update the hotness value of the to-be-identified function; and a second determining circuit, configured to: determine whether an updated hotness value that is of the to-be-identified function and is obtained by the updating circuit is greater than or equal to a hotness threshold of the to-be-identified function, and when the updated hotness value of the to-be-identified function is greater than or equal to the hotness threshold of the to-be-identified function, use intermediate code of the to-be-identified function as hotspot intermediate code.

Updating the hotness value of the to-be-identified function means that a current hotness value is replaced with a new hotness value. The current hotness value changes after being updated, and the updated current hotness value or the updated hotness value becomes a new hotness value before updating.

The apparatus obtains the instruction address in the instruction counter, and determines whether the native instruction corresponding to the instruction address in the instruction counter is the native instruction of the to-be-identified function, so as to identify the hotspot intermediate code during code execution by an interpreter or a just-in-time compiler.

According to the first aspect, in a first possible implementation manner of the apparatus, the first determining circuit is configured to:

determine whether the instruction address in the instruction counter is within an address range of native instruction space of the to-be-identified function, where native instructions in the native instruction space of the to-be-identified function include the native instruction of the to-be-identified function, and the native instructions in the native instruction space of the to-be-identified function do not include a native instruction used to implement functions of the language virtual machine. In this implementation manner, it can be effectively distinguished whether a currently executed instruction is the native instruction used to implement the functions of the language virtual machine or a native instruction of a function executed by the language virtual machine, so as to easily and effectively determine whether the native instruction corresponding to the instruction address in the instruction counter is the native instruction of the to-be-identified function. The function may also be referred to as a method, the native instruction used to implement the functions of the language virtual machine may also be referred to as an instruction in host code, and the native instruction of the function executed by the language virtual machine may also be referred to as an instruction in guest code.

According to the first implementation manner of the first aspect, in a second possible implementation manner of the apparatus, the language virtual machine includes an interpreter, the native instructions in the native instruction space of the to-be-identified function include native instructions corresponding to intermediate instructions that are used to be interpreted by the interpreter, and the native instructions corresponding to the intermediate instructions that are used to be interpreted by the interpreter include the native instruction of the to-be-identified function.

Correspondingly, that the to-be-identified function is executed may include: the intermediate code of the to-be-identified function is executed.

During interpretation of intermediate code by the interpreter in the language virtual machine, native instructions corresponding to all the intermediate instructions are stored in consecutive storage space, that is, storage space of the native instruction that may be obtained by means of interpretation by the interpreter. The storage space may be memory space, the native code may be assembly code, and the intermediate code may be bytecode. It is determined whether an instruction address of a currently executed native instruction is within an address range of the storage space of the native instruction that may be obtained by means of interpretation by the interpreter, so that in an interpretation phrase of the interpreter, it can be determined whether the native instruction corresponding to the instruction address in the instruction counter is the native instruction of the to-be-identified function.

According to the first implementation manner of the first aspect, in a third possible implementation manner of the apparatus, the language virtual machine includes a just-in-time compiler, the native instruction space of the to-be-identified function is used to store native code of the to-be-identified function, the native instruction of the to-be-identified function is an instruction in the native code of the to-be-identified function, and the native code of the to-be-identified function is obtained by means of compilation by the just-in-time compiler.

Correspondingly, that the to-be-identified function is executed may include: the native code of the to-be-identified function is executed.

The native code that is of the to-be-identified function and is obtained by means of compilation by the just-in-time compiler is stored, by using the to-be-identified function as a whole, in storage space used to store the native code of the to-be-identified function. The storage space may be a memory. For example, the storage space may be a code cache (code cache). The native code of the to-be-identified function may be lightweight native code that is of the to-be-identified function and is obtained by a lightweight compiler of the just-in-time compiler, or may be heavyweight native code that is of the to-be-identified function and is obtained by a heavyweight compiler of the just-in-time compiler. When the native code of the to-be-identified function is the lightweight native code, it is determined whether an instruction address of a currently executed native instruction is within an address range of the storage space used to store the native code of the to-be-identified function, so that, when the lightweight native code is executed, it is determined whether the native instruction corresponding to the instruction address in the instruction counter is the native instruction of the to-be-identified function. When the native code of the to-be-identified function is the heavyweight native code, it is determined whether an instruction address of a currently executed native instruction is within an address range of the storage space used to store the native code of the to-be-identified function, so that when the heavyweight native code is executed, it is determined whether the native instruction corresponding to the instruction address in the instruction counter is the native instruction of the to-be-identified function, thereby collecting statistics on execution frequency of the heavyweight native code.

According to the first aspect, or any one of the foregoing implementation manners of the first aspect, in a fourth possible implementation manner of the apparatus, the updating circuit includes a hotness value counter, and the hotness value counter is configured to increase, by 1, the hotness value of the to-be-identified function in the hotness value counter. The hotness value counter is a counter, and may be triggered, by using an entered level (for example, by using a changeable rising edge of the level), to perform counting. In this way, an implementation manner of counting by software is replaced, and a burden of software-based implementation is relieved. In addition, a circuit directly performs counting, and this leads to higher execution efficiency.

According to the fourth implementation manner of the first aspect, in a fifth possible implementation manner of the apparatus, the second determining circuit includes a subtractor and a threshold register configured to store the hotness threshold of the to-be-identified function, the subtractor is connected to the threshold register, the subtractor is connected to the hotness value counter, the subtractor is configured to obtain a difference by subtracting the hotness threshold of the to-be-identified function in the threshold register from the updated hotness value of the to-be-identified function in the hotness value counter, and when the difference is greater than or equal to 0, it indicates that the updated hotness value of the to-be-identified function is greater than or equal to the hotness threshold of the to-be-identified function.

The subtractor, the threshold register, and the hotness value counter are connected, and the circuit determines whether the updated hotness value of the to-be-identified function is greater than or equal to the hotness threshold of the to-be-identified function, so that a code operation amount is further reduced, and execution efficiency is further higher.

According to the fourth implementation manner of the first aspect, in a sixth possible implementation manner of the apparatus, the second determining circuit includes a first comparator and a threshold register configured to store the hotness threshold of the to-be-identified function, the first comparator is connected to the threshold register, the first comparator is connected to the hotness value counter, and the first comparator is configured to determine whether the updated hotness value of the to-be-identified function in the hotness value counter is greater than or equal to the hotness threshold of the to-be-identified function in the threshold register.

The first comparator, the threshold register, and the hotness value counter are connected, and the circuit determines whether the updated hotness value of the to-be-identified function is greater than or equal to the hotness threshold of the to-be-identified function, so that a burden of software-based implementation is relieved, and execution efficiency is further higher.

According to the fifth or the sixth implementation manner of the first aspect, in a possible implementation manner of a seventh implementation manner of the apparatus, the apparatus further includes a processor and a memory; the memory is configured to store code; and by reading the code stored in the memory, the processor is configured to:

when the language virtual machine calls the to-be-identified function, load the current hotness value of the to-be-identified function to the hotness value counter; and when the language virtual machine returns the to-be-identified function, store, in the memory, the updated hotness value of the to-be-identified function in the hotness value counter.

A value in the hotness value counter is the hotness value of the to-be-identified function only during execution of the to-be-identified function. In this way, in a process of not executing the to-be-identified function, the hotness value counter may be used to implement another function, and therefore, usage of storage resources is improved.

According to the seventh possible implementation manner of the foregoing first aspect, in another implementation manner of the seventh implementation manner of the first aspect, the processor may be further configured to: when the language virtual machine calls the to-be-identified function, load the hotness threshold of the to-be-identified function to the threshold register, so as to adapt to a case in which different functions have different hotness thresholds. It should be understood that, after the language virtual machine returns the to-be-identified function, the threshold register may be used for a purpose other than a purpose of storing the hotness threshold of the to-be-identified function.

According to the seventh possible implementation manner of the foregoing first aspect, in another implementation manner of the seventh implementation manner of the first aspect, the processor may be further configured to: when the language virtual machine returns the to-be-identified function, store, in the memory, the hotness threshold of the to-be-identified function in the threshold register, so as to adapt to a case in which the hotness threshold in the threshold register changes during execution of the to-be-identified function.

According to the seventh implementation manner of the first aspect, in an eighth possible implementation manner of the apparatus, the processor is further configured to: when the language virtual machine calls the to-be-identified function, store, in the memory, an updated hotness value of a calling function in the hotness value counter, where the to-be-identified function is a subfunction of the calling function; and when the language virtual machine returns the to-be-identified function, load a current hotness value of the calling function to the hotness value counter. In this way, the hotness values of the calling function and the to-be-identified function may be separately processed.

When the different functions have the different hotness thresholds, the processor may be further configured to: when the language virtual machine returns the to-be-identified function, load a hotness threshold of the calling function to the threshold register; and during execution of the calling function, when the hotness threshold in the threshold register changes, the processor may be further configured to: when the to-be-identified function is called, store, in the memory, the hotness threshold of the calling function in the threshold register.

According to the first aspect, or any one of the foregoing implementation manners of the first aspect, in a ninth possible implementation manner of the apparatus, the obtaining circuit includes an instruction address register connected to the instruction counter, the instruction address register triggers, by receiving a trigger level, the action of obtaining the instruction address in the instruction counter, and the instruction address register is further configured to store the instruction address in the instruction counter.

The circuit obtains an instruction address in the instruction counter, so that a burden of software-based implementation is relieved, and execution efficiency is further higher.

According to the ninth implementation manner of the first aspect, in a tenth possible implementation manner of the apparatus, the native instruction space of the to-be-identified function is storage space in which addresses are continuous, the address range of the native instruction space of the to-be-identified function is indicated by a start address of the native instruction space of the to-be-identified function and an end address of the native instruction space of the to-be-identified function, the end address of the native instruction space of the to-be-identified function is greater than or equal to the start address of the native instruction space of the to-be-identified function;

the first determining circuit includes: a start address register configured to store the start address of the native instruction space of the to-be-identified function, an end address register configured to store the end address of the native instruction space of the to-be-identified function, a third comparator, and a second comparator, where the third comparator is connected to the instruction address register, the third comparator is connected to the start address register, and the third comparator is configured to compare whether the instruction address that is in the instruction counter and is stored in the instruction address register is greater than or equal to the start address of the native instruction space of the to-be-identified function in the start address register; and the second comparator is connected to the instruction address register, the second comparator is connected to the end address register, and the second comparator is configured to: compare whether the instruction address that is in the instruction counter and is stored in the instruction address register is less than or equal to the end address of the native instruction space of the to-be-identified function in the end address register; and when the instruction address in the instruction counter is greater than or equal to the start address of the native instruction space of the to-be-identified function and is less than or equal to the end address of the native instruction space of the to-be-identified function, it indicates that the instruction address in the instruction counter is within the address range of the native instruction space of the to-be-identified function.

An address refers to a logical address or a physical address, and that addresses are continuous means that all storage space corresponding to address values from a minimum address value to a maximum address value that are in the native instruction space of the to-be-identified function is the storage space of the native instruction space.

In another implementation manner of the tenth implementation manner of the first aspect, the start address register and the end address register may be used as one register, and the register may store both the start address of the native instruction space of the to-be-identified function and the end address of the native instruction space of the to-be-identified function.

The second comparator, the third comparator, the instruction address register, the start address register, and the end address register are connected, and the circuit determines whether the native instruction corresponding to the instruction address in the instruction counter is the native instruction of the to-be-identified function. In this way, a burden of software-based implementation is relieved, and execution efficiency is further higher.

When the tenth implementation manner of the apparatus is combined with the sixth implementation manner of the apparatus, the second comparator and the third comparator are directly or indirectly connected to the hotness value counter by using a logic gate. By using a level that is outputted by the second comparator and the third comparator and is used to indicate that the native instruction corresponding to the instruction address in the instruction counter is the native instruction of the to-be-identified function, the hotness value counter is triggered to perform counting of increasing by 1, so that hotspot intermediate code may be identified, that is, the hotspot intermediate code is identified by a hardware circuit independent of a code execution process in the language virtual machine. In this way, a burden of software-based implementation is relieved, and execution efficiency is further higher.

According to the tenth implementation manner of the first aspect, in a possible implementation manner of an eleventh implementation manner of the apparatus, the apparatus includes the processor and the memory; the memory is configured to store code; and by reading the code stored in the memory, the processor is configured to:

when the language virtual machine calls the to-be-identified function, load the start address of the native instruction space of the to-be-identified function to the start address register, and load the end address of the native instruction space of the to-be-identified function to the end address register.

A value in the start address register is the start address of the native instruction space of the to-be-identified function, and a value in the end address register is the end address of the native instruction space of the to-be-identified function only during execution of the to-be-identified function by the language virtual machine. In this way, in a process of not executing the to-be-identified function, the start address register and the end address register may be used to implement other functions, and therefore, usage of storage resources is improved. In addition, this implementation manner may adapt to a case in which different functions have different start addresses or end addresses.

According to the eleventh possible implementation manner of the foregoing first aspect, in another implementation manner of the eleventh implementation manner of the first aspect, the processor may be further configured to: when the language virtual machine returns the to-be-identified function, store, in the memory, the start address of the native instruction space of the to-be-identified function in the start address register, and store, in the memory, the end address of the native instruction space of the to-be-identified function in the end address register, so as to adapt to a case in which the start address of the native instruction space of the to-be-identified function and the end address of the native instruction space of the to-be-identified function change during execution of the to-be-identified function. It should be understood that, after the language virtual machine returns the to-be-identified function, the start address register and the end address register may be used for a purpose other than a purpose of storing the start address and the end address of the to-be-identified function.

According to the eleventh implementation manner of the first aspect, in a twelfth possible implementation manner of the apparatus, the processor is configured to:

when the language virtual machine returns the to-be-identified function, load a start address of native instruction space of the calling function to the start address register, and load an end address of the native instruction space of the calling function to the end address register, where the to-be-identified function is the subfunction of the calling function, so as to adapt to a case in which the calling function and the to-be-identified function have different start addresses and different end addresses.

It should be understood that the processor may be further configured to: when the to-be-identified function is called, store, in the memory, the start address of the native instruction space of the calling function in the start address register, and store, in the memory, the end address of the native instruction space of the calling function in the end address register.

According to the first aspect, or any one of the foregoing implementation manners of the first aspect, in a thirteenth possible implementation manner of the apparatus, the obtaining circuit is configured to periodically trigger, by receiving a periodic trigger level, the action of obtaining the instruction address in the instruction counter. The instruction address in the instruction counter may be periodically obtained by timing by software, or the obtaining action may be triggered by using a periodic clock signal. When the obtaining circuit is the instruction address register, input of the instruction address register is separately from the instruction counter and the periodic trigger level. The level may be a periodic clock signal, and synchronization between the instruction address register and the instruction counter is triggered on a rising edge or a falling edge of the clock signal.

The instruction counter periodically obtains the instruction address in the instruction counter, so as to form a large amount of steady data for processing. In this way, an impact brought by a random factor is reduced, and the obtained hotness value has higher reliability.

According to the first aspect, or any one of the foregoing implementation manners of the first aspect, in a fourteenth possible implementation manner of the apparatus, the apparatus includes the processor and the memory; the memory is configured to store code; and by reading the code stored in the memory, the processor is configured to:

when the language virtual machine returns the to-be-identified function, or after the language virtual machine returns the to-be-identified function, trigger the second determining circuit to perform the action of determining whether the updated hotness value that is of the to-be-identified function and is obtained by the updating circuit is greater than or equal to the hotness threshold of the to-be-identified function.

For a case in which the to-be-identified function is returned once the to-be-identified function is executed, the foregoing determining action is performed during execution of the to-be-identified function. In comparison with a case in which the foregoing determining action is performed only when the to-be-identified function is returned or after the to-be-identified function is returned, moments for obtaining two determining results do not affect this execution status of the to-be-identified function. However, when the instruction address in the instruction counter is periodically obtained, it cannot be accurately determined, in the former case, whether the intermediate code of the to-be-identified function is the hotspot intermediate code when the function is executed next time. This is because a determining result obtained by means of determining during function execution is that the intermediate code of the to-be-identified function is not the hotspot intermediate code, but the hotness value of the to-be-identified function may still increase during a time period from determining to function returning. It cannot be accurately determined, in the former case, whether the intermediate code of the to-be-identified function is the hotspot intermediate code when the function is executed next time, but it can be accurately determined, in the later case, whether the intermediate code of the to-be-identified function is the hotspot intermediate code when the function is executed next time.

According to the first aspect, or any one of the foregoing implementation manners of the first aspect, in a possible implementation manner of a fifteenth implementation manner of the apparatus, the apparatus includes the processor and the memory; the memory is configured to store code; and by reading the code stored in the memory, the processor is configured to:

after the second determining circuit determines that the updated hotness value of the to-be-identified function is greater than or equal to the hotness threshold of the to-be-identified function, store the updated hotness value of the to-be-identified function in the memory;

when a hotness value of the to-be-identified function before a preset time period is greater than or equal to the hotness threshold of the to-be-identified function, calculate a difference by subtracting the hotness value of the to-be-identified function before the preset time period from the updated hotness value of the to-be-identified function in the memory, where the hotness value of the to-be-identified function before the preset time period is stored in the memory; and when the difference is less than a preset deletion threshold, delete the native code of the to-be-identified function from the memory.

An objective of identifying hotspot intermediate code is as follows: Execution efficiency of native code is higher than execution efficiency of intermediate code, and therefore, hotspot intermediate code is compiled by a just-in-time compiler into native code and the native code is stored in storage space used to store the native code for calling. The apparatus may eliminate in a timely manner native code infrequently executed recently. In this way, more storage space can store newly generated native code, utilization of storage space is improved, and code execution efficiency is further improved.

According to the first aspect, or any one of the foregoing implementation manners of the first aspect, in a sixteenth possible implementation manner of the apparatus, the apparatus further includes a function information register configured to store function information of the to-be-identified function, and the function information is used to indicate the to-be-identified function; the apparatus includes the processor and the memory; the memory is configured to store code; and by reading the code stored in the memory, the processor is configured to:

load the function information of the to-be-identified function to the function information register, so that the processor compiles, according to the function information of the to-be-identified function in the function information register, the intermediate code of the to-be-identified function into the native code of the to-be-identified function by using the intermediate code of the to-be-identified function as the hotspot intermediate code.

According to a second aspect, a method for identifying hotspot intermediate code is provided, and the method includes: when a language virtual machine executes a to-be-identified function, obtaining an instruction address in an instruction counter, and determining whether a native instruction corresponding to the instruction address in the instruction counter is a native instruction of the to-be-identified function; when the native instruction corresponding to the instruction address in the instruction counter is the native instruction of the to-be-identified function, increasing a current hotness value of the to-be-identified function by a preset value, to update the hotness value of the to-be-identified function; and determining whether an updated hotness value of the to-be-identified function is greater than or equal to a hotness threshold of the to-be-identified function, and when the updated hotness value of the to-be-identified function is greater than or equal to the hotness threshold of the to-be-identified function, using intermediate code of the to-be-identified function as hotspot intermediate code.

The method may be implemented by means of software programming, or may be implemented by a circuit that can implement this method; or a part of the method may be implemented by means of software programming, and the other part is implemented by a circuit. The native instruction refers to an instruction in native code. Likewise, an instruction in intermediate code is an intermediate instruction.

According to the method, the instruction address in the instruction counter is obtained, and it is determined whether the native instruction corresponding to the instruction address in the instruction counter is the native instruction of the to-be-identified function, so that hotspot intermediate code can be identified.

According to the second aspect, in a first possible implementation manner of the method, the determining whether a native instruction corresponding to the instruction address in the instruction counter is a native instruction of the to-be-identified function includes: determining whether the instruction address in the instruction counter is within an address range of native instruction space of the to-be-identified function, where native instructions in the native instruction space of the to-be-identified function include the native instruction of the to-be-identified function, and the native instructions in the native instruction space of the to-be-identified function do not include a native instruction used to implement functions of the language virtual machine.

According to the first implementation manner of the second aspect, a second possible implementation manner of the method may be obtained with reference to the second possible implementation manner of the first aspect, and a third possible implementation manner of the method may be obtained with reference to the third possible implementation manner of the first aspect.

According to any one of the first to the third implementation manners of the second aspect, in a fourth possible implementation manner of the method, the native instruction space of the to-be-identified function is storage space in which addresses are continuous, the address range of the native instruction space of the to-be-identified function is indicated by a start address of the native instruction space of the to-be-identified function and an end address of the native instruction space of the to-be-identified function, the end address of the native instruction space of the to-be-identified function is greater than or equal to the start address of the native instruction space of the to-be-identified function, and the determining whether the instruction address in the instruction counter is within an address range of native instruction space of the to-be-identified function includes:

determining whether the instruction address in the instruction counter is greater than or equal to the start address of the native instruction space of the to-be-identified function, and whether the instruction address in the instruction counter is less than or equal to the end address of the native instruction space of the to-be-identified function; and when the instruction address in the instruction counter is greater than or equal to the start address of the native instruction space of the to-be-identified function and is less than or equal to the end address of the native instruction space of the to-be-identified function, it indicates that the instruction address in the instruction counter is within the address range of the native instruction space of the to-be-identified function.

According to the second aspect, or any one of the foregoing implementation manners of the second aspect, in a fifth possible implementation manner of the method, the obtaining an instruction address in an instruction counter includes: periodically obtaining the instruction address in the instruction counter; and the determining whether an updated hotness value of the to-be-identified function is greater than or equal to a hotness threshold of the to-be-identified function includes:

when the language virtual machine returns the to-be-identified function, or after the language virtual machine returns the to-be-identified function, determining whether the updated hotness value of the to-be-identified function is greater than or equal to the hotness threshold of the to-be-identified function.

The instruction address in the instruction counter may be periodically obtained by timing by software, or the obtaining action may be triggered by using a periodic clock signal. For example, the periodic clock signal triggers a specified register to periodically obtain the instruction address in the instruction counter. The instruction address in the instruction counter is periodically obtained, so as to form a large amount of steady data for processing. In this way, an impact brought by a random factor is reduced, and the obtained hotness value has higher reliability.

According to the second aspect, or any one of the foregoing implementation manners of the second aspect, in a sixth possible implementation manner of the method, after it is determined that the updated hotness value of the to-be-identified function is greater than or equal to the hotness threshold of the to-be-identified function, the method further includes:

when a hotness value of the to-be-identified function before a preset time period is greater than or equal to the hotness threshold of the to-be-identified function, calculating a difference by subtracting the hotness value of the to-be-identified function before the preset time period from the updated hotness value of the to-be-identified function; and when the difference is less than a preset deletion threshold, deleting the native code of the to-be-identified function from storage space used to store the native code of the to-be-identified function.

According to the first implementation manner of the second aspect, in a seventh possible implementation manner of the method, after the native code of the to-be-identified function is deleted from the storage space used to store the native code of the to-be-identified function, the hotness value of the to-be-identified function may be further zeroed out.

According to a third aspect, an apparatus for identifying hotspot intermediate code is provided, and the apparatus includes:

an obtaining unit, configured to: when a language virtual machine executes a to-be-identified function, obtain an instruction address in an instruction counter;

a first determining unit, configured to determine, according to the instruction address that is in the instruction counter and is obtained by the obtaining unit, whether a native instruction corresponding to the instruction address in the instruction counter is a native instruction of the to-be-identified function;

an updating unit, configured to: when the first determining unit determines that the native instruction corresponding to the instruction address in the instruction counter is the native instruction of the to-be-identified function, increase a current hotness value of the to-be-identified function by a preset value, to update the hotness value of the to-be-identified function; and a second determining unit, configured to: determine whether an updated hotness value that is of the to-be-identified function and is obtained by the updating unit is greater than or equal to a hotness threshold of the to-be-identified function, and when the updated hotness value of the to-be-identified function is greater than or equal to the hotness threshold of the to-be-identified function, use intermediate code of the to-be-identified function as hotspot intermediate code.

According to the third aspect, in a first possible implementation manner of the apparatus, the first determining unit is configured to:

determine whether the instruction address in the instruction counter is within an address range of native instruction space of the to-be-identified function, where native instructions in the native instruction space of the to-be-identified function include the native instruction of the to-be-identified function, and the native instructions in the native instruction space of the to-be-identified function do not include a native instruction used to implement functions of the language virtual machine.

According to the first implementation manner of the third aspect, a second possible implementation manner of the apparatus may be obtained with reference to the second possible implementation manner of the first aspect, and a third possible implementation manner of the apparatus may be obtained with reference to the third possible implementation manner of the first aspect.

According to any one of the first to the third implementation manners of the third aspect, in a fourth possible implementation manner of the apparatus, the native instruction space of the to-be-identified function is storage space in which addresses are continuous, the address range of the native instruction space of the to-be-identified function is indicated by a start address of the native instruction space of the to-be-identified function and an end address of the native instruction space of the to-be-identified function, and the end address of the native instruction space of the to-be-identified function is greater than or equal to the start address of the native instruction space of the to-be-identified function; and the first determining unit is configured to:

determine whether the instruction address in the instruction counter is greater than or equal to the start address of the native instruction space of the to-be-identified function, and whether the instruction address in the instruction counter is less than or equal to the end address of the native instruction space of the to-be-identified function; and when the instruction address in the instruction counter is greater than or equal to the start address of the native instruction space of the to-be-identified function and is less than or equal to the end address of the native instruction space of the to-be-identified function, it indicates that the instruction address in the instruction counter is within the address range of the native instruction space of the to-be-identified function.

According to the third aspect, or any one of the foregoing implementation manners of the third aspect, in a fifth possible implementation manner of the apparatus, the obtaining unit is configured to periodically obtain the instruction address in the instruction counter; and correspondingly, the second determining unit is configured to: when the language virtual machine returns the to-be-identified function, or after the language virtual machine returns the to-be-identified function, determine whether the updated hotness value of the to-be-identified function is greater than or equal to the hotness threshold of the to-be-identified function.

According to the third aspect, or any one of the foregoing implementation manners of the third aspect, in a sixth possible implementation manner of the apparatus, the apparatus further includes a calculation unit and a deletion unit; where the calculation unit is configured to: after the second determining unit determines that the updated hotness value that is of the to-be-identified function and is obtained by the updating unit is greater than or equal to the hotness threshold of the to-be-identified function, calculate a difference by subtracting a hotness value of the to-be-identified function before a preset time period from the updated hotness value of the to-be-identified function, where the hotness value of the to-be-identified function before the preset time is greater than or equal to the hotness threshold of the to-be-identified function; and the deletion unit is configured to: when the difference obtained by the calculation unit is less than a preset deletion threshold, delete the native code of the to-be-identified function from storage space used to store the native code of the to-be-identified function.

According to a fourth aspect, an apparatus for identifying hotspot intermediate code is provided, and the apparatus includes a processor and a memory; the memory is configured to store code; and by reading the code stored in the memory, the processor is configured to execute the method provided in the second aspect.

According to a fifth aspect, a computer storage medium is provided and is used to store a computer software instruction used to be executed by the processor in the third aspect, to execute the method provided in the second aspect.

It can be learned, from the foregoing implementation manners provided in the embodiments of the present disclosure, that an instruction address in an instruction counter is obtained, and it is determined whether a native instruction corresponding to the instruction address in the instruction counter is a native instruction of a to-be-identified function, so that hotspot intermediate code can be identified.

BRIEF DESCRIPTION OF DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the embodiments of the present disclosure with reference to accompanying drawings.

Figure 1:
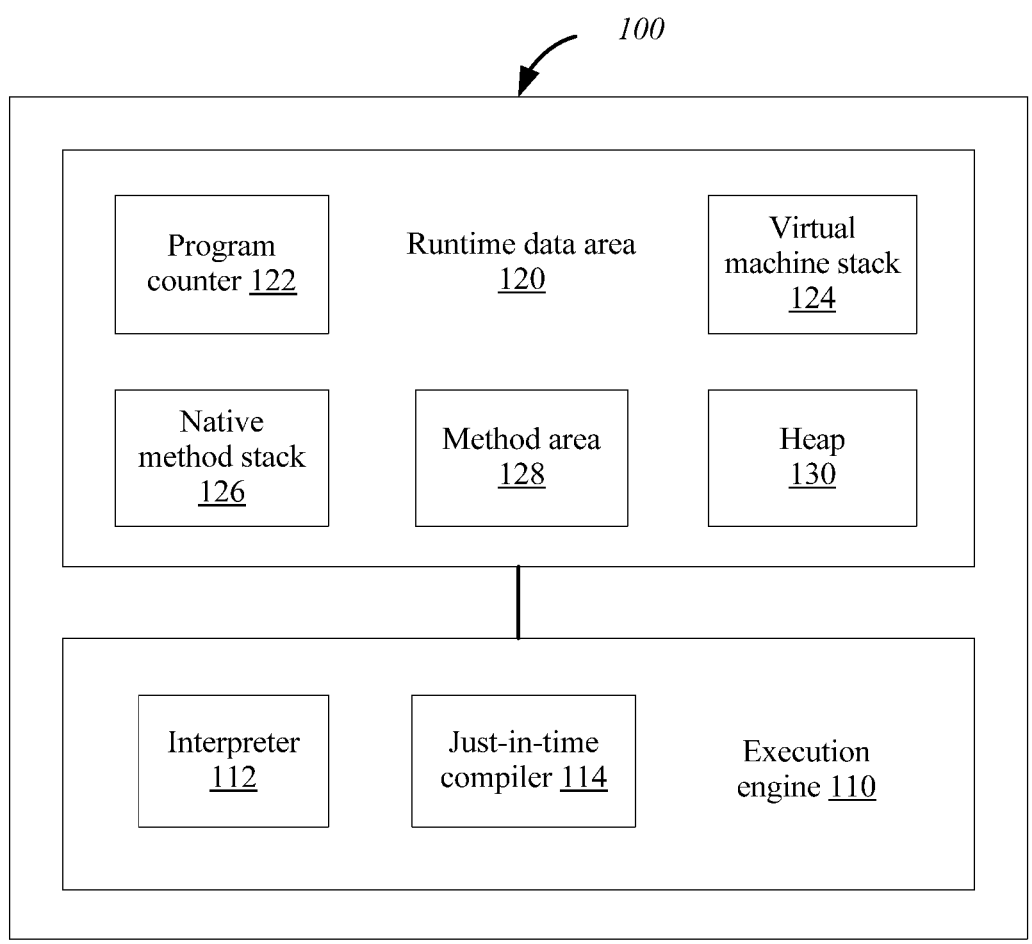
FIG. 1 is a schematic block diagram of a language virtual machine according to an embodiment of the present disclosure.

FIG. 1 is a schematic block diagram of a language virtual machine 100. The language virtual machine 100 is a virtual computer, and is implemented by means of emulation and simulation of various computer functions in an actual computer. The language virtual machine 100 may be in a memory of a computer device, and obtains a code (the code is also referred to as a host (host) method, or is referred to as a non-guest (guest) method) of the language virtual machine 100 by using a processor of the computer device, and the processor executes functions of the language virtual machine 100. The language virtual machine 100 includes an execution engine (execution engine) 110 and a runtime data area (runtime data area) 120.

The execution engine 110 is configured to execute intermediate code, and includes an interpreter (Interpreter) 112 and a just-in-time (JIT) compiler 114.

The runtime data area 120 is used to store data in a running process of the language virtual machine 100, and is created when the language virtual machine 100 is started and is removed when the language virtual machine 100 is exited. The runtime data area 120 includes: an instruction counter (Program Counter Register) 122, a virtual machine stack (Stack) 124, a native method stack (Native Method Stack) 126, a method area (Method Area) 128, and a heap (Heap) 130. The method is also referred to as a function. It should be understood that unless otherwise stated, the method or the function needs to be understood as a guest (guest) method.

The program counter 122 is a memory area and is configured to store a next to-be-executed bytecode instruction.

The virtual machine stack 124 indicates a memory model for method execution. One stack frame (Stack Frame) is generated each time one method is called, and the stack frame includes three parts: a native variable (Native Variables) area, an operand stack (Operand Stack), and a frame data (Frame Data) area. The native variable area is used to store a native variable and a parameter in the method. The operand stack is used to store an intermediate result generated in a method execution process. The frame data area is used for data parsing, returning a processing method after the method is executed, restoring a scene of a calling method, and the like in a constant pool (constant_pool). The constant pool is determined in a compilation period, and is stored in a compiled .class file. The constant pool includes a constant for a class or a method, or a constant on an interface, and also includes a string constant and symbol quotation. Each type has its constant pool.

Similar to the virtual machine stack, the native method stack 126 is used when a native method is executed. When the language virtual machine is a JVM, the native method is a method implemented by using a non-JAVA language.

The method area 128 is used to store information that is already loaded by the virtual machine, for example, type information, a constant, a static variable, and instantly compiled code. A part of the method area 128 is a runtime constant pool (Runtime Constant Pool) that is mainly used to store an independent variable and symbol quotation that are generated during compilation, and the constant may also be generated during running, for example, an intern method of a string.

The heap 130 is a location that is in the virtual machine and is used to store an object and an array. A Java heap only needs to be logically continuous, but may not be continuous in physical space.

Figure 2:
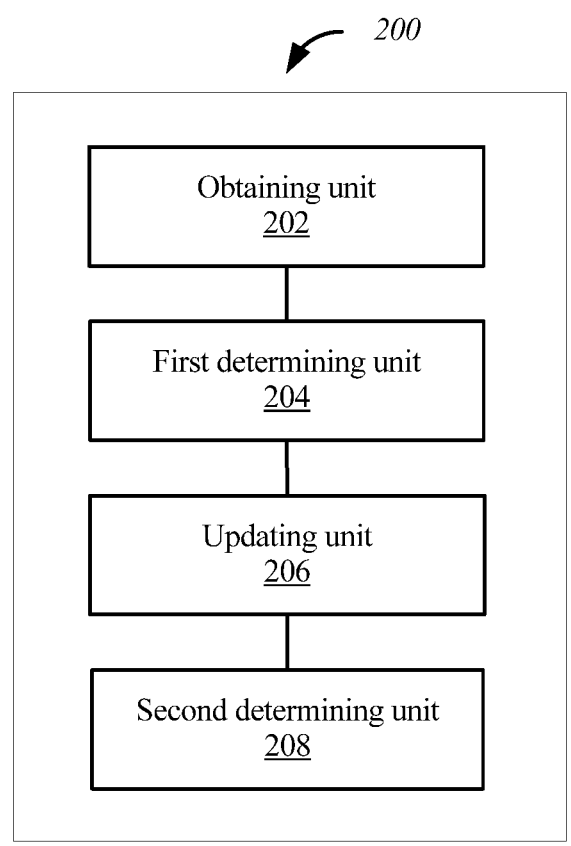
FIG. 2 is a schematic diagram of a logical structure of an apparatus for identifying hotspot intermediate code according to an embodiment of the present disclosure.

FIG. 2 is a schematic diagram of a logical structure of an apparatus 200 for identifying hotspot intermediate code applied to a language virtual machine 100. As shown in FIG. 2, the apparatus 200 for identifying hotspot intermediate code includes an obtaining unit 202, a first determining unit 204, an updating unit 206, and a second determining unit 208. It should be understood that the apparatus 200 for identifying hotspot intermediate code may be a computer device. The units in the apparatus 200 for identifying hotspot intermediate code may be implemented by means of software programming, or may be implemented by using a hardware circuit. The hardware circuit or software includes one or more units in the apparatus 200 for identifying hotspot intermediate code.

When the units in the apparatus 200 are implemented by means of software programming, the apparatus 200 for identifying hotspot intermediate code may be a computer device that includes the language virtual machine 100, or the apparatus 200 for identifying hotspot intermediate code may be a computer device that does not include the language virtual machine 100, and establishes information exchange with a computer device that includes the language virtual machine 100, to implement functions of the units in the apparatus 200 for identifying hotspot intermediate code. The units in the apparatus 200 for identifying hotspot intermediate code may be used as execution units of the language virtual machine 100, or may be directly used to be executed by a processor of the computer device.

When the units in the apparatus 200 are implemented by using the hardware circuit, the obtaining unit 202 is referred to as an obtaining circuit, the first determining unit 204 is referred to as a first determining circuit, the updating unit 206 is referred to as an updating circuit, and the second determining unit 208 is referred to as a second determining circuit. The apparatus 200 for identifying hotspot intermediate code may establish information exchange with a computer device that includes the language virtual machine 100, to implement functions of the circuits in the apparatus 200 for identifying hotspot intermediate code. Information exchange is established by means of wired connection or wireless network communication. Alternatively, the apparatus 200 for identifying hotspot intermediate code may be a computer device that includes the language virtual machine 100 and the circuits in the apparatus 200 for identifying hotspot intermediate code.

The obtaining unit 202 is configured to: when the language virtual machine 100 executes a to-be-identified function, obtain an instruction address in an instruction counter. The to-be-identified function may also be referred to as a to-be-identified method.

It should be noted that the instruction counter may also be referred to as a program counter, but is different from the program counter 122 in the language virtual machine 100. The program counter 122 is a memory area that stores next bytecode (an intermediate instruction), but the instruction counter is a register in the processor, and the instruction counter stores an address of a next native instruction that is to be executed by the processor. The instruction counter is also in the computer device that includes the language virtual machine 100.

When being used as the obtaining circuit, the obtaining unit 202 may be an instruction address register 302 connected to the instruction counter. The instruction address register 302 triggers, by receiving a trigger level, the action of obtaining the instruction address in the instruction counter, and the instruction address register 302 is further configured to store the obtained instruction address. "Connected" herein includes "physically connected" and "establishing information exchange".

During specific implementation, the trigger level may be periodic. For example, when the apparatus 200 for identifying hotspot intermediate code is the computer device, the trigger level may be a clock signal of the apparatus 200 for identifying hotspot intermediate code or a signal obtained by means of frequency division performed on a clock signal. The obtaining circuit (which may be the instruction address register 302) may periodically trigger, by receiving a periodic trigger level, the action of obtaining the instruction address in the instruction counter.

The first determining unit 204 is configured to determine, according to the instruction address that is in the instruction counter and is obtained by the obtaining unit 202, whether a native instruction corresponding to the instruction address in the instruction counter is a native instruction of the to-be-identified function.

The first determining unit 204 may be configured to: obtain, according to the instruction address, an instruction corresponding to the instruction address, and further determine whether the instruction corresponding to the instruction address is the native instruction of the to-be-identified function.

The first determining unit 204 may be configured to determine whether the instruction address in the instruction counter is within an address range of native instruction space of the to-be-identified function. The native instruction of the to-be-identified function is stored in the native instruction space of the to-be-identified function, and native instructions in the native instruction space do not include a native instruction used to implement functions of the language virtual machine 100. It should be understood that, when the interpreter 112 of the language virtual machine 100 executes intermediate code of the to-be-identified function, native instructions corresponding to all intermediate instructions are stored in consecutive storage space in memory space of a memory, and may be stored in the method area 128. The interpreter 112 queries the native instructions that are in the consecutive storage space in the memory and are corresponding to the intermediate instructions, to one-by-one interpret intermediate instructions in intermediate code of the to-be-identified function into corresponding native instructions. Therefore, when the interpreter 112 executes the intermediate code of the to-be-identified function, the native instruction space is storage space used to store a native instruction that may be obtained by means of interpretation by the interpreter 112, or may be referred to as storage space used by the interpreter 112 to query the native instruction corresponding to the intermediate instruction. Native instructions in the native instruction space include native instructions corresponding to intermediate instructions that are used to be interpreted by the interpreter 112, and the native instructions corresponding to the intermediate instructions that are used to be interpreted by the interpreter 112 include the native instruction of the to-be-identified function.

In addition, it should be understood that, after compiling the intermediate code into the native code, the just-in-time compiler 114 of the language virtual machine 100 stores the native code in memory space of the memory, for example, a code cache (code cache). During specific implementation, the code cache may be in the method area 128. Therefore, when the just-in-time compiler 114 of the language virtual machine 100 executes the native code of the to-be-identified function, the native instruction space is the storage space used to store the native code of the to-be-identified function, and the native instruction of the to-be-identified function is an instruction in the native code of the to-be-identified function.

During specific implementation, the native instruction space may be storage space in which addresses are continuous. The address range of the native instruction space may be indicated by a start address of the native instruction space and an end address of the native instruction space, and the end address of the native instruction space is greater than or equal to the start address of the native instruction space.

Optionally, the first determining unit 204 may be configured to: determine whether the instruction address is greater than or equal to the start address of the native instruction space of the to-be-identified function, and whether the instruction address is less than or equal to the end address of the native instruction space of the to-be-identified function. When the instruction address is greater than or equal to the start address of the native instruction space of the to-be-identified function and is less than or equal to the end address of the native instruction space of the to-be-identified function, the instruction address in the instruction counter is within the address range of the native instruction space of the to-be-identified function.

Optionally, when being used as the first determining circuit, the first determining unit 204 may further include a start address register 304 used to store the start address of the native instruction space of the to-be-identified function, and an end address register 306 used to store the end address of the native instruction space of the to-be-identified function.

Optionally, the first determining circuit may include a third comparator and a second comparator. The third comparator is connected to the instruction address register 302, the third comparator is connected to the start address register 304, and the third comparator is configured to compare whether the instruction address in the instruction address register 302 is greater than or equal to the start address of the native instruction space of the to-be-identified function in the start address register 304. The second comparator is connected to the instruction address register 302, the second comparator is connected to the end address register 306, and the second comparator is configured to compare whether the instruction address in the instruction address register 302 is less than or equal to the end address of the native instruction space of the to-be-identified function in the end address register 306, and when the instruction address is greater than or equal to the start address of the native instruction space of the to-be-identified function and is less than or equal to the end address of the native instruction space of the to-be-identified function, it indicates that the instruction address in the instruction counter is within the address range of the native instruction space of the to-be-identified function.

Optionally, the first determining circuit may include a third subtractor and a second subtractor. The third subtractor is connected to the instruction address register 302, and the third subtractor is connected to the start address register 304. The third subtractor is configured to compare, by obtaining a difference between the instruction address in the instruction address register 302 and the start address of the native instruction space of the to-be-identified function in the start address register 304, whether the instruction address in the instruction address register 302 is greater than or equal to the start address of the native instruction space of the to-be-identified function in the start address register 304. The second subtractor is connected to the instruction address register 302, and the second subtractor is connected to the end address register 306. The second subtractor is configured to compare, by obtaining a difference between the instruction address in the instruction address register 302 and the end address of the native instruction space of the to-be-identified function in the end address register 306, whether the instruction address in the instruction address register 302 is less than or equal to the end address of the native instruction space of the to-be-identified function in the end address register 306. When the instruction address is greater than or equal to the start address of the native instruction space of the to-be-identified function and is less than or equal to the end address of the native instruction space of the to-be-identified function, the instruction address in the instruction counter is within the address range of the native instruction space of the to-be-identified function.

The updating unit 206 is configured to: when the first determining unit 204 determines that the native instruction corresponding to the instruction address in the instruction counter is the native instruction of the to-be-identified function, increase a current hotness value of the to-be-identified function by a preset value, to update the hotness value of the to-be-identified function.

When being used as the updating circuit, the updating unit 206 may be a hotness value counter 310. A hotness value counter is a counter that stores a hotness value, and the hotness value counter 310 is configured to increase, by 1, the hotness value of the to-be-identified function in the hotness value counter 310.

The second determining unit 208 is configured to: determine whether an updated hotness value that is of the to-be-identified function and is obtained by the updating unit 206 is greater than or equal to a hotness threshold of the to-be-identified function, and when the updated hotness value of the to-be-identified function is greater than or equal to the hotness threshold of the to-be-identified function, use intermediate code of the to-be-identified function as hotspot intermediate code.

Optionally, the obtaining unit 202 may periodically obtain the instruction address in the instruction counter. Correspondingly, the second determining unit 208 may be configured to: when the to-be-identified function is returned, or after the to-be-identified function is returned, determine whether the updated hotness value of the to-be-identified function is greater than or equal to the hotness threshold of the to-be-identified function.

Optionally, when being used as the second determining circuit, the second determining unit 208 may include a threshold register 312 configured to store the hotness threshold of the to-be-identified function.

Optionally, the second determining circuit may further include a subtractor 314, the subtractor 314 is connected to the threshold register 312, and the subtractor 314 is connected to the hotness value counter 310. The subtractor 314 is configured to obtain a difference by subtracting the hotness threshold of the to-be-identified function in the threshold register 312 from the updated hotness value of the to-be-identified function in the hotness value counter 310. When the difference is greater than or equal to 0, the updated hotness value of the to-be-identified function is greater than or equal to the hotness threshold of the to-be-identified function.

Optionally, the second determining circuit may include a first comparator, the first comparator is connected to the threshold register 312, and the first comparator is connected to the hotness value counter 310. The first comparator is configured to determine whether the updated hotness value of the to-be-identified function in the hotness value counter 310 is greater than or equal to the hotness threshold of the to-be-identified function in the threshold register 312. The processor may directly or indirectly obtain an output result of the subtractor 314 or the first comparator, to confirm whether the updated hotness value of the to-be-identified function is greater than or equal to the hotness threshold of the to-be-identified function.

During specific implementation, when the first determining circuit includes the third subtractor and the second subtractor, the hotness value counter 310 may be directly connected to the third subtractor and the second subtractor, or the third subtractor and the second subtractor may be first indirectly connected to the hotness value counter 310 by using a logic gate circuit. When output results of the third subtractor and the second subtractor indicate that the updated hotness value of the to-be-identified function is greater than or equal to the hotness threshold of the to-be-identified function, the hotness value counter 310 is triggered to perform counting of increasing by 1.

During specific implementation, when the first determining circuit includes the third comparator and the second comparator, the hotness value counter 310 may be directly connected to the third comparator and the second comparator, or the third comparator and the second comparator may be first indirectly connected to the hotness value counter 310 by using a logic gate circuit. When output results of the third comparator and the second comparator indicate that the updated hotness value of the to-be-identified function is greater than or equal to the hotness threshold of the to-be-identified function, the hotness value counter 310 is triggered to perform counting of increasing by 1.

After the intermediate code of the to-be-identified function is used as the hotspot intermediate code, the just-in-time compiler 114 may compile the intermediate code of the to-be-identified function into the native code of the to-be-identified function.

During specific implementation, a corresponding data structure may be established for each function, the data structure may be named as metadata, and the data structure may be, for example, a class (class) or a structure (struct). In an example of the to-be-identified function, data that may be recorded in metadata of the to-be-identified function includes: an identifier of the to-be-identified function, a start address of the to-be-identified function, an end address of the to-be-identified function, the hotness value of the to-be-identified function, and the hotness threshold of the to-be-identified function. When different functions use a same hotness threshold, the metadata of the to-be-identified function may not include the hotness threshold of the to-be-identified function, and the hotness threshold is used as a public value of the functions. When this embodiment is only used for hotspot identification during intermediate code execution by the interpreter 112, the metadata of the to-be-identified function may not include the start address of the to-be-identified function and the end address of the to-be-identified function, and the start address and the end address are used as public values of the functions. After the intermediate code of the to-be-identified function is used as the hotspot intermediate code, the identifier of the to-be-identified function is used to enable the just-in-time compiler to obtain the intermediate code of the to-be-identified function by using the identifier of the to-be-identified function, so as to compile the intermediate code of the to-be-identified function into the native code of the to-be-identified function. The identifier of the to-be-identified function is not used for hotspot identification. Therefore, for identification of hotspot intermediate code, the metadata of the to-be-identified function may not include the identifier of the to-be-identified function.

The apparatus 200 for identifying hotspot intermediate code may include a processor and a memory, the memory is configured to store code, and by reading the code stored in the memory, the processor may be configured to: when the language virtual machine 100 calls the to-be-identified function, load the current hotness value of the to-be-identified function to the hotness value counter 310, and when the language virtual machine 100 returns the to-be-identified function, store, in the memory, the updated hotness value of the to-be-identified function in the hotness value counter 310.

Optionally, the processor may be further configured to: when the language virtual machine 100 calls the to-be-identified function, store, in the memory, an updated hotness value of a calling function in the hotness value counter 310, where the to-be-identified function is a subfunction of the calling function, that is, a function body of the calling function includes a call instruction for the to-be-identified function; and when the language virtual machine 100 returns the to-be-identified function, load a current hotness value of the calling function to the hotness value counter 310.

Optionally, the processor may be further configured to: when the language virtual machine 100 calls the to-be-identified function, load the start address of the native instruction space of the to-be-identified function to the start address register 304, and load the end address of the native instruction space of the to-be-identified function to the end address register 306.

Optionally, the processor may be further configured to: when the language virtual machine 100 returns the to-be-identified function, store, in the memory, the start address of the native instruction space of the to-be-identified function in the start address register 304, and store, in the memory, the end address of the native instruction space of the to-be-identified function in the end address register 306.

Optionally, the processor may be further configured to: when the to-be-identified function is called, store, in the memory, a start address of native instruction space of the calling function in the start address register 304, and store, in the memory, an end address of the native instruction space of the calling function in the end address register 306.

Optionally, the processor may be further configured to: when the language virtual machine 100 returns the to-be-identified function, load the start address of the native instruction space of the calling function to the start address register 304, and load the end address of the native instruction space of the calling function to the end address register 306.

During specific implementation, the foregoing operations: loading and storing may be implemented by modifying a function call instruction and by modifying a function return instruction. In an example of an assembly instruction, one operand may be added to the function call instruction, and the added operand may be an address of the metadata of the to-be-identified function, for example, a metadata pointer of the function. It should be understood that a segment of storage space may be set in the memory as pointer space that stores a metadata pointer of a currently executed function. For example, the storage space may be but not limited to a register and a pointer stack that is set in the memory for storing a metadata pointer.

In an example in which the to-be-identified function is called by using the function call instruction to which the operand is added, when a value of the added operand is a preset value (for example, 0), the function call instruction to which the operand is added is used as a function call instruction in the conventional art. When a value of the added operand is not a preset value, the added operand is used as the metadata pointer of the to-be-identified function, to execute the following operations. Optional operations thereof include: (1) storing, in storage space that is in metadata of the calling function and stores the hotness value of the to-be-identified function, a value in the hotness value counter 310 according to a metadata pointer of the calling function in the pointer space; (2) pushing, into the pointer stack, the metadata pointer of the calling function in the pointer space, where during specific implementation, the pointer stack may be established in the virtual machine stack 124 and is configured only to store a metadata pointer; (3) loading the metadata pointer of the to-be-identified function to the pointer space; (4) loading the hotness value of the to-be-identified function to the hotness value counter 310 according to the metadata pointer of the to-be-identified function; (5) according to the metadata pointer of the to-be-identified function, loading the start address of the to-be-identified function to the start address register 304, and loading the end address of the to-be-identified function to the end address register 306. Operations thereof include: (1) pushing a return address of the calling function into a stack; (2) jumping to an execution entrance of the to-be-identified function.

During specific implementation, in an example of an assembly instruction, one operand may be added to the function return instruction, the added operand may be an identifier and is used to instruct the function return instruction to which the operand is added to execute the following operations. Optional operations thereof include: (1) storing, in the storage space that is in the metadata of the to-be-identified function and stores the hotness value of the to-be-identified function, a hotness value in the hotness value counter 310 according to the metadata pointer of the to-be-identified function in the pointer space; (2) pulling the metadata pointer of the calling function from the pointer stack, and loading the metadata pointer of the calling function to the pointer space; (3) loading the hotness value of the calling function to the hotness value counter 310 according to the metadata pointer of the calling function in the pointer space; (4) according to the metadata pointer of the calling function in the pointer space, loading the start address of the calling function to the start address register 304, and loading the end address of the calling function to the end address register 306. Operations thereof include: (1) pulling the return address of the calling function from a stack, and returning to the calling function for execution.

Optionally, the processor may be further configured to: when the to-be-identified function is returned, or after the to-be-identified function is returned, trigger the second determining unit 208 to perform the action of determining whether the updated hotness value that is of the to-be-identified function and is obtained by the updating unit 206 is greater than or equal to the hotness threshold of the to-be-identified function.

Optionally, after an output result of the second determining unit 208 indicates that the updated hotness value of the to-be-identified function is greater than or equal to the hotness threshold of the to-be-identified function, a lightweight compiler or a heavyweight compiler of the just-in-time compiler 114 may compile the intermediate code of the to-be-identified function into the native code of the to-be-identified function.

Optionally, the processor may be further configured to: after the output result of the second determining unit 208 indicates that the updated hotness value of the to-be-identified function is greater than or equal to the hotness threshold of the to-be-identified function, store the updated hotness value of the to-be-identified function in the memory; when a hotness value of the to-be-identified function before a preset time period is greater than or equal to the hotness threshold of the to-be-identified function, calculate a difference by subtracting the hotness value of the to-be-identified function before the preset time period from the updated hotness value of the to-be-identified function in the memory, where the hotness value of the to-be-identified function before the preset time period is stored in the memory; and when the difference is less than a preset deletion threshold, delete the native code of the to-be-identified function from the memory (for example, the code cache in the memory).

The solution for selectively deleting the native code of the to-be-identified function from the memory aims to monitor in real time execution frequency of the native code obtained by means of compilation. During specific implementation, a hotness value of each function that is stored in metadata of each function may be obtained at a specified interval by traversing pointers in the pointer stack, and the second determining unit 208 (or a unit having a same function as that of the second determining unit) may perform determining, to obtain a function whose hotness value is greater than a hotness threshold. Then, the function whose hotness value is greater than the hotness threshold may be written into a linked list 1 in a [method, count1] form (or the hotness value is stored in the memory in another manner), where method is function information, and count1 is the hotness value of each function that is stored in the metadata of each function. In addition, there is another linked list 2 in which [method, count2] is stored, where count2 is a hotness value that is of a function whose hotness value is greater than the hotness threshold and that is obtained at a previous time of traversing the pointers in the pointer stack. In an example of the to-be-identified function, when there is count2 of the to-be-identified function, count1 of the to-be-identified function may be subtracted by count2. When a difference is less than the deletion threshold, it means that the to-be-identified function is infrequently executed within a time period from previous traversal to current traversal. The native code of the to-be-identified function may be deleted from the memory, and space is reserved for a method frequently executed recently. In this way, storage space utilization is improved.

Optionally, in another implementation manner of a deletion operation, the apparatus 200 for identifying hotspot intermediate code may further include a calculation unit and a deletion unit.

The calculation unit is configured to: when the updated hotness value that is of the to-be-identified function and is obtained by the updating unit 206 is greater than or equal to the hotness threshold of the to-be-identified function, calculate a difference by subtracting a hotness value of the to-be-identified function before a preset time period from the updated hotness value of the to-be-identified function, where the hotness value of the to-be-identified function before the preset time is greater than or equal to the hotness threshold of the to-be-identified function.

When being used as the calculation circuit, the calculation unit may be connected to the updating unit 206 to determine whether the updated hotness value of the to-be-identified function is greater than or equal to the hotness threshold of the to-be-identified function, or may be connected to the second determining unit 208 to obtain a determining result.

The deletion unit is configured to: when the difference obtained by the calculation unit is less than the preset deletion threshold, delete the native code of the to-be-identified function from the storage space (for example, the code cache) of the native code of the to-be-identified function.

It should be understood that the units (the obtaining unit 202, the first determining unit 204, the updating unit 206, or the second determining unit 208) in the apparatus 200 for identifying hotspot intermediate code have difference relationships with the memory and the processor in different implementation manners. A unit implemented by software in the apparatus 200 for identifying hotspot intermediate code may be in the memory, and the processor implements a function of the unit by reading the unit from the memory. A unit implemented by using a hardware circuit in the apparatus 200 for identifying hotspot intermediate code may be integrated into the processor, or may be connected to the processor.

It should be understood that a subtraction operation may be implemented by a summator when the apparatus 200 for identifying hotspot intermediate code is implemented by using the hardware circuit, and therefore, the subtractors in this embodiment of the present disclosure may be replaced with summators, to implement the subtraction operation.

Figure 3:
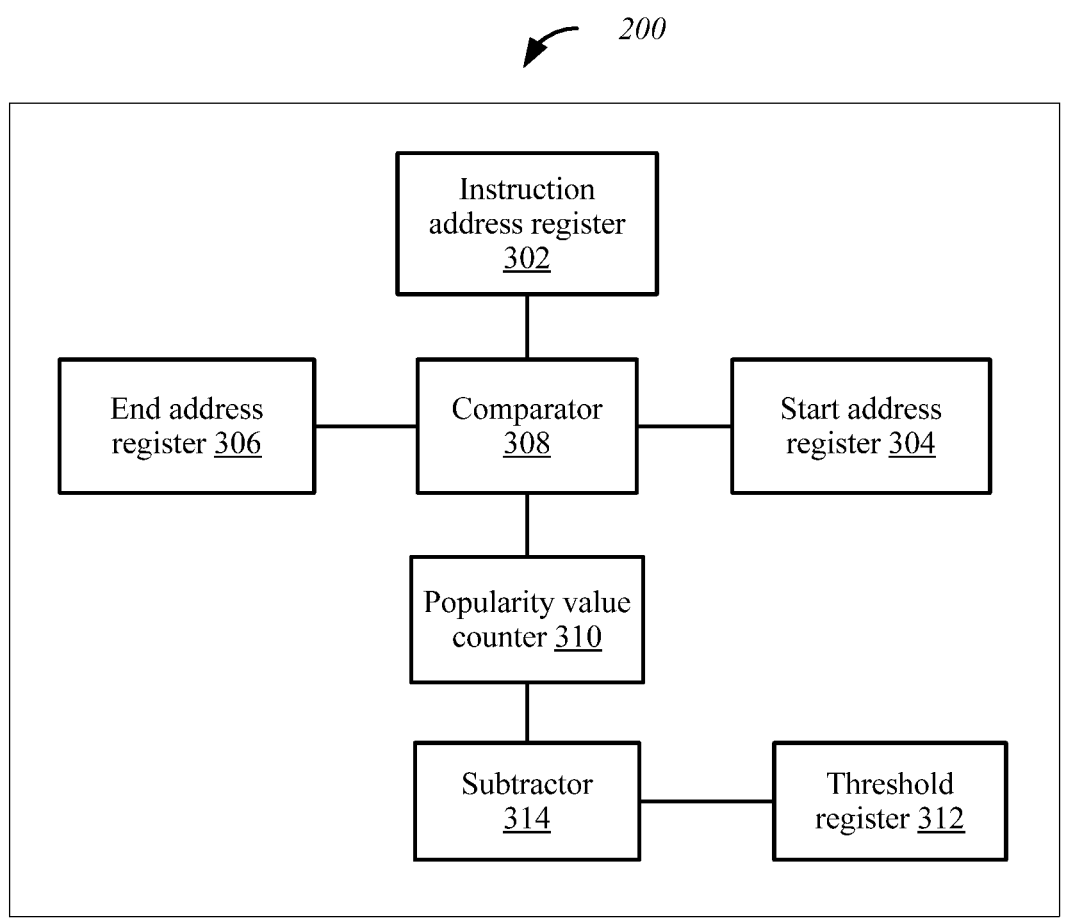
FIG. 3 is a schematic diagram of a logical structure of a hardware circuit according to an embodiment of the present disclosure.

For example, FIG. 3 is a hardware circuit implementation manner of the apparatus 200 for identifying hotspot intermediate code. It should be understood that the hardware circuit implementation manner of the apparatus 200 for identifying hotspot intermediate code in this embodiment of the present disclosure is not limited thereto, and a connection manner of the units in FIG. 3 is not limited thereto either. A comparator 308 includes the second comparator and the third comparator, or a comparator 308 includes the second subtractor and the third subtractor. Content of the second subtractor, the third subtractor, the second comparator, the third comparator, the end address register 306, the instruction address register 302, the start address register 304, the hotness value counter 310, the threshold register 312, and the subtractor 314 is already described in detail above, and is no longer described herein.

Figure 4:
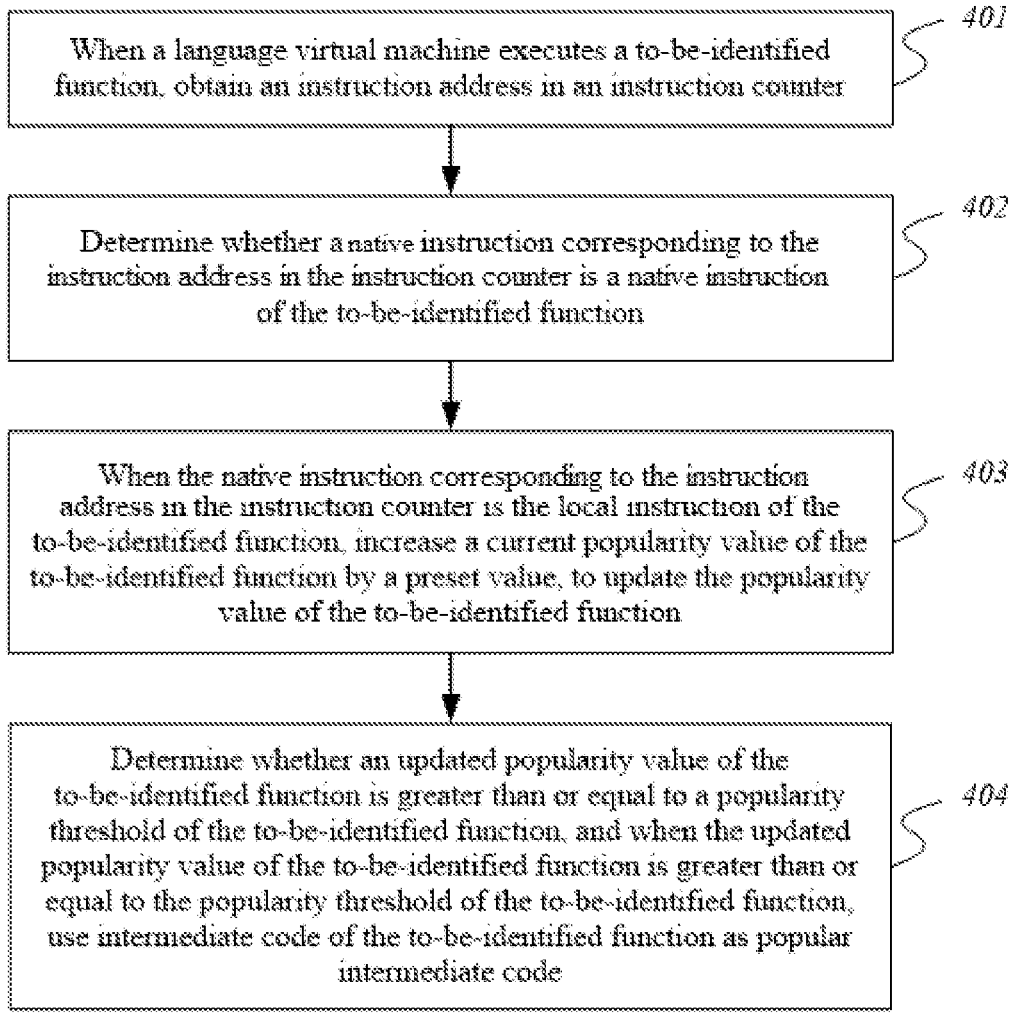
FIG. 4 is a schematic flowchart of a method for identifying hotspot intermediate code according to an embodiment of the present disclosure.

FIG. 4 is a schematic flowchart of a method for identifying hotspot intermediate code applied in the language virtual machine 100. The method may be executed by the apparatus 200 for identifying hotspot intermediate code, and the method includes the following steps.

S401. When the language virtual machine 100 executes a to-be-identified function, obtain an instruction address in an instruction counter.

S402. Determine whether a native instruction corresponding to the instruction address in the instruction counter is a native instruction of the to-be-identified function.

In an optional implementation manner for determining whether the native instruction corresponding to the instruction address in the instruction counter is the native instruction of the to-be-identified function, it can be determined whether the instruction address in the instruction counter is within an address range of native instruction space of the to-be-identified function. Native instructions in the native instruction space of the to-be-identified function include the native instruction of the to-be-identified function, and the native instructions in the native instruction space of the to-be-identified function do not include a native instruction used to implement functions of the language virtual machine. The native instruction space of the to-be-identified function stores the native instruction.

Optionally, when intermediate code of the to-be-identified function is executed, the language virtual machine 100 includes the interpreter 112. The native instruction space may be storage space used to store native instructions that may be obtained by means of interpretation by the interpreter 112, or the native instructions in the native instruction space of the to-be-identified function include native instructions corresponding to intermediate instructions that are used to be interpreted by the interpreter 112. The native instructions corresponding to the intermediate instructions that are used to be interpreted by the interpreter include the native instruction of the to-be-identified function.

Optionally, when native code of the to-be-identified function is executed, the language virtual machine 100 includes a just-in-time compiler 114. The native instruction space may be used to store the native code of the to-be-identified function, the native instruction of the to-be-identified function is an instruction in the native code of the to-be-identified function, and the native code of the to-be-identified function is obtained by means of compilation by the just-in-time compiler 114.

Optionally, the native instruction space is storage space in which addresses are continuous, the address range of the native instruction space is indicated by a start address of the native instruction space and an end address of the native instruction space, and the end address of the native instruction space of the to-be-identified function is greater than or equal to the start address of the native instruction space of the to-be-identified function. The determining whether the instruction address in the instruction counter is within the address range of the native instruction space of the to-be-identified function may be: determining whether the instruction address in the instruction counter is greater than or equal to the start address of the native instruction space of the to-be-identified function, and whether the instruction address is less than or equal to the end address of the native instruction space of the to-be-identified function, and when the instruction address is greater than or equal to the start address of the native instruction space of the to-be-identified function and is less than or equal to the end address of the native instruction space of the to-be-identified function, it indicates that the instruction address in the instruction counter is within the address range of the native instruction space of the to-be-identified function.

Optionally, the instruction address in the instruction counter may be periodically obtained, to update a hotness value of the to-be-identified function.

S403. When the native instruction corresponding to the instruction address in the instruction counter is the native instruction of the to-be-identified function, increase a current hotness value of the to-be-identified function by a preset value, to update the hotness value of the to-be-identified function. The preset value is a positive number, for example, a positive integer. Optionally, an increased preset value may be 1.

S404. Determine whether an updated hotness value of the to-be-identified function is greater than or equal to a hotness threshold of the to-be-identified function, and when the updated hotness value of the to-be-identified function is greater than or equal to the hotness threshold of the to-be-identified function, use intermediate code of the to-be-identified function as hotspot intermediate code.

Optionally, the intermediate code of the to-be-identified function may be used as the hotspot intermediate code, and the hotspot intermediate code is compiled by the just-in-time compiler 114 into the native code of the to-be-identified function.

Optionally, when the language virtual machine 100 returns the to-be-identified function, or after the language virtual machine 100 returns the to-be-identified function, it is determined whether the updated hotness value of the to-be-identified function is greater than or equal to the hotness threshold of the to-be-identified function.

Optionally, when a hotness value of the to-be-identified function before a preset time period is greater than or equal to the hotness threshold of the to-be-identified function, a difference is calculated by subtracting the hotness value of the to-be-identified function before the preset time period from the updated hotness value of the to-be-identified function. When the difference is less than a preset deletion threshold, the native code of the to-be-identified function is deleted from storage space used to store the native code of the to-be-identified function. It should be understood that the hotness value of the to-be-identified function before the preset time period may be understood as a hotness value of the to-be-identified function at a moment A. A current moment is B, and the moment A is prior to the moment B by the preset time period. After the native code of the to-be-identified function is deleted from the storage space used to store the native code of the to-be-identified function, the hotness value of the to-be-identified function may be further zeroed out.

The method embodiment and the apparatus embodiment of the present disclosure are derived from a same conception. Therefore, for specific content, refer to description of operations performed by corresponding components in the apparatus embodiment of the present disclosure. Details are not described herein.

Figure 5:
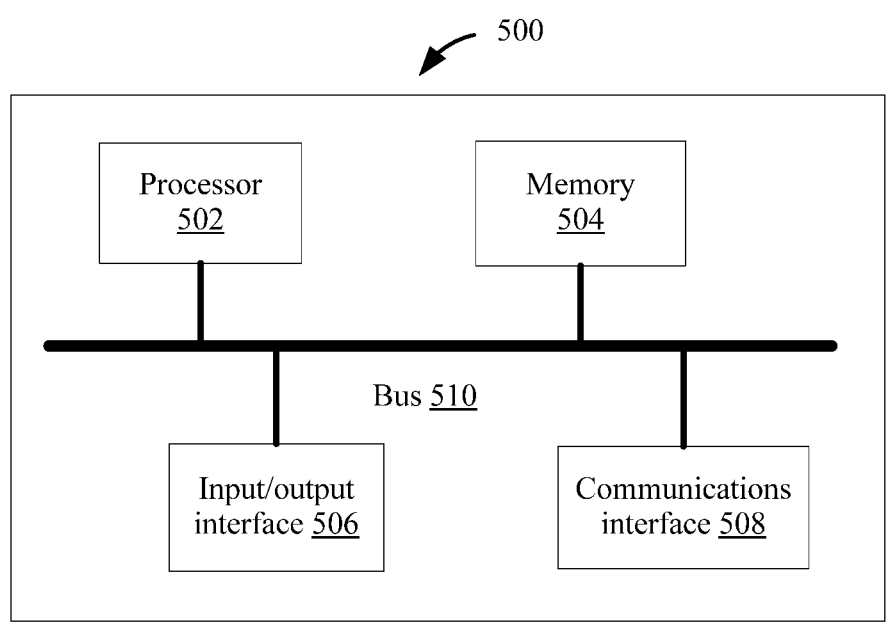
FIG. 5 is a schematic diagram of a hardware structure of a computer device according to an embodiment of the present disclosure.

FIG. 5 is a schematic structural diagram of hardware of a computer device 500 according to an embodiment of the present disclosure. As shown in FIG. 5, the computer device 500 may be used as an implementation manner of the apparatus 200 for identifying hotspot intermediate code, and the computer device 500 includes: a processor 502, a memory 504, an input/output interface 506, a communications interface 508, and a bus 510. The processor 502, the memory 504, the input/output interface 506, and the communications interface 508 implement a communication connection to each other by using the bus 510.

The processor 502 may use a general-purpose central processing unit (CPU), a microprocessor, an application specific integrated circuit (ASIC), or one or more integrated circuits to execute a related program, so as to implement the technical solutions provided in embodiments of the present disclosure.

The memory 504 may be a read-only memory (ROM), a static storage device, a dynamic storage device, or a random access memory (RAM). The memory 504 may store an operating system, the language virtual machine 100, and another application program. When functions that need to be executed by units and components included in the apparatus 200 for identifying hotspot intermediate code provided in the embodiments of the present disclosure are implemented by software or firmware, or the foregoing method provided in the embodiments of the present disclosure is executed, program code used to implement the technical solutions provided in the embodiments of the present disclosure is stored in the memory 504, and the processor 502 executes operations that need to be executed by the units and the components included in the apparatus 200 for identifying hotspot intermediate code provided in the embodiments of the present disclosure, or executes the foregoing method provided in the embodiments of the present disclosure.

The input/output interface 506 is configured to: receive entered data and information, and output data such as an operation result.

The communications interface 508 uses a transceiver apparatus that is for example but is not limited to a transceiver, to implement communication between the computer device 500 and another device or another communications network.

The bus 510 may include a path for sending information between the components (for example, the processor 502, the memory 504, the input/output interface 506, and the communications interface 508) of the computer device 500.

It should be noted that only the processor 502, the memory 504, the input/output interface 506, the communications interface 508, and the bus 510 are shown for the computer device 500 shown in FIG. 5, but during specific implementation, a person skilled in the art should understand that the computer device 500 may further includes another component for normal operating, for example, a display screen. In addition, according to a specific requirement, a person skilled in the art should understand that the computer device 500 may further include a hardware component for implementing another additional function. Further, a person skilled in the art should understand that the computer device 500 may include only a component for implementing the embodiments of the present disclosure, and not necessarily include all components shown in FIG. 5.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that the actions and modules involved in this specification are not necessarily mandatory to the present disclosure.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM, Read-Only Memory), or a random access memory (RAM, Random Access Memory).

Although the present disclosure is described herein with reference to the embodiments, during implementation of the present disclosure that claims protection, a person skilled in the art may understand and implement other variations of the disclosed embodiments by viewing the accompanying drawings, the disclosed content, and the accompanying claims. In the claims, a word "comprising" (comprising) does not exclude another component or step, and "a" or "one" does not exclude a possibility of "multiple". A single processor or another unit may implement several functions enumerated in the claims. Some measures are recorded in dependent claims that are different from each other, but this does not mean that these measures cannot be combined to produce a better effect. The computer program may be stored/distributed in a proper medium, for example, an optical storage medium or a solid-state storage medium, to be provided as or serve as a part of hardware together with another hardware, or may use another distribution form such as the Internet or another wired or wireless telecommunications system.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. A method for identifying a hotspot intermediate code, wherein the method comprises:
    when a language virtual machine executes a function, obtaining an instruction address in an instruction counter, and determining whether the instruction address in the instruction counter is greater than or equal to a start address of a native instruction space of the function and less than or equal to an end address of the native instruction space of the function;
    when the instruction address in the instruction counter is greater than or equal to the start address of the native instruction space of the function and less than or equal to the end address of the native instruction space of the function, increasing a current hotness value of the function by a preset value, to update the hotness value of the function; and
    determining whether an updated hotness value of the-function is greater than or equal to a hotness threshold of the function, and when the updated hotness value of the function is greater than or equal to the hotness threshold of the function, using an intermediate code of the function as the hotspot intermediate code.

2. The method of claim 1,
    wherein native instructions in the native instruction space of the function comprise the native instruction of the function, and the native instructions in the native instruction space of function do not comprise a native instruction used to implement functions of the language virtual machine.

3. The method of claim 2, wherein the language virtual machine comprises an interpreter, the native instructions in the native instruction space of the function comprise native instructions corresponding to intermediate instructions that are used to be interpreted by the interpreter, and the native instructions corresponding to the intermediate instructions that are used to be interpreted by the interpreter comprise the native instruction of the function.

4. The method of claim 2, wherein the language virtual machine comprises a just-in-time compiler, the native instruction space of the-function is used to store native code of the function, the native instruction of the function is an instruction in the native code of the function, and the native code of the function is obtained by means of compilation by the just-in-time compiler.

5. The method of claim 2, wherein the native instruction space of the function is a storage space in which addresses are continuous, the address range of the native instruction space of the function is indicated by the start address of the native instruction space of the function and the end address of the native instruction space of the function, the end address of the native instruction space of the function is greater than or equal to the start address of the native instruction space of the function.

6. The method of claim 1, wherein the obtaining an instruction address in an instruction counter comprises: periodically obtaining the instruction address in the instruction counter; and
    the determining whether an updated hotness value of the function is greater than or equal to a hotness threshold of the function comprises:
    when the language virtual machine returns the function, or after the language virtual machine returns the function, determining whether the updated hotness value of the function is greater than or equal to the hotness threshold of the function.

7. The method of claim 1, wherein after it is determined that the updated hotness value of the function is greater than or equal to the hotness threshold of the function, the method further comprises:
    when a hotness value of the function before a preset time period is greater than or equal to the hotness threshold of the function, calculating a difference by subtracting the hotness value of the function before the preset time period from the updated hotness value of the function; and
    when the difference is less than a preset deletion threshold, deleting the native code of the function from storage space used to store the native code of the function.

8. An apparatus for identifying hotspot intermediate code, wherein the apparatus comprises:
    an obtaining circuit, configured to: when a language virtual machine executes a function, obtain an instruction address in an instruction counter;
    a first determining circuit, configured to determine, according to the instruction address that is in the instruction counter and is obtained by the obtaining circuit, whether the instruction address in the instruction counter is greater than or equal to a start address of a native instruction space of the function and less than or equal to an end address of the native instruction space of the function;
    an updating circuit, configured to: when the instruction address in the instruction counter is greater than or equal to the start address of the native instruction space of the function and less than or equal to the end address of the native instruction space of the function, increase a current hotness value of the function by a preset value, to update the hotness value of the function; and
    a second determining circuit, configured to: determine whether an updated hotness value that is of the function and is obtained by the updating circuit is greater than or equal to a hotness threshold of the function, and when the updated hotness value of the function is greater than or equal to the hotness threshold of the function, use intermediate code of the function as hotspot intermediate code.

9. The apparatus of claim 8,
    wherein native instructions in the native instruction space of the function comprise the native instruction of the function, and the native instructions in the native instruction space of the function do not comprise a native instruction used to implement functions of the language virtual machine.

10. The apparatus of claim 9, wherein the language virtual machine comprises an interpreter, the native instructions in the native instruction space of the function comprise native instructions corresponding to intermediate instructions that are used to be interpreted by the interpreter, and the native instructions corresponding to the intermediate instructions that are used to be interpreted by the interpreter comprise the native instruction of the function.

11. The apparatus of claim 9, wherein the language virtual machine comprises a just-in-time compiler, the native instruction space of the function is used to store native code of the function, the native instruction of the function is an instruction in the native code of the function, and the native code of the function is obtained by the just-in-time compiler by means of compilation.

12. The apparatus of claim 9, wherein the obtaining circuit comprises an instruction address register connected to the instruction counter, the instruction address register triggers, by receiving a trigger level, the action of obtaining the instruction address in the instruction counter, and the instruction address register is further configured to store the instruction address in the instruction counter.

13. The apparatus of claim 8, wherein the updating circuit comprises a hotness value counter, and the hotness value counter is configured to increase, by 1, the hotness value of the function in the hotness value counter.

14. The apparatus of claim 13, wherein the second determining circuit comprises a subtractor and a threshold register configured to store the hotness threshold of the function, the subtractor is connected to the threshold register, the subtractor is connected to the hotness value counter, the subtractor is configured to obtain a difference by subtracting the hotness threshold of the function in the threshold register from the updated hotness value of the function in the hotness value counter, and when the difference is greater than or equal to 0, it indicates that the updated hotness value of the function is greater than or equal to the hotness threshold of the function.

15. The apparatus of claim 14, wherein the apparatus further comprises a processor and a memory; the memory is configured to store code; and by reading the code stored in the memory, the processor is configured to:
when the language virtual machine calls the function, load the current hotness value of the function to the hotness value counter; and
when the language virtual machine returns the function, store, in the memory, the updated hotness value of the function in the hotness value counter.

16. The apparatus of claim 13, wherein the second determining circuit comprises a first comparator and a threshold register configured to store the hotness threshold of the function, the first comparator is connected to the threshold register, the first comparator is connected to the hotness value counter, and the first comparator is configured to determine whether the updated hotness value of the function in the hotness value counter is greater than or equal to the hotness threshold of the function in the threshold register.

17. The apparatus of claim 8, wherein the obtaining circuit is configured to periodically trigger, by receiving a periodic trigger level, the action of obtaining the instruction address in the instruction counter; and
the apparatus comprises the processor and the memory; the memory is configured to store code; by reading the code stored in the memory, the processor is configured to:
when the language virtual machine returns the function, or after the language virtual machine returns the function, trigger the second determining circuit to perform the action of determining whether the updated hotness value that is of the function and is obtained by the updating circuit is greater than or equal to the hotness threshold of the function.

18. The apparatus of claim 8, wherein the apparatus comprises the processor and the memory; the memory is configured to store code; and by reading the code stored in the memory, the processor is configured to:
after the second determining circuit determines that the updated hotness value of the function is greater than or equal to the hotness threshold of the function, store the updated hotness value of the function in the memory;
when a hotness value of the function before a preset time period is greater than or equal to the hotness threshold of the function, calculate a difference by subtracting the hotness value of the function before the preset time period from the updated hotness value of the function in the memory, wherein the hotness value of the function before the preset time period is stored in the memory; and
when the difference is less than a preset deletion threshold, delete the native code of the function from the memory.

19. A non-transitory computer-readable medium storing computer instructions for identifying hotspot intermediate code, that when executed by a baseband processor and an application processor of a terminal, cause the baseband processor and the application processor to perform the method comprising:
when a language virtual machine executes a function, obtaining an instruction address in an instruction counter, and determining whether the instruction address in the instruction counter is greater than or equal to a start address of a native instruction space of the function and less than or equal to an end address of the native instruction space of the function;
when the instruction address in the instruction counter is greater than or equal to the start address of the native instruction space of the function and less than or equal to the end address of the native instruction space of the function, increasing a current hotness value of the function by a preset value, to update the hotness value of the function; and
determining whether an updated hotness value of the function is greater than or equal to a hotness threshold of the function, and when the updated hotness value of the function is greater than or equal to the hotness threshold of the function, using intermediate code of the function as hotspot intermediate code.

20. The non-transitory computer-readable medium of claim 19,
wherein native instructions in the native instruction space of the function comprise the native instruction of the function, and the native instructions in the native instruction space of the function do not comprise a native instruction used to implement functions of the language virtual machine.

21. The non-transitory computer-readable medium of claim 20, wherein the language virtual machine comprises an interpreter, the native instructions in the native instruction space of the function comprise native instructions corresponding to intermediate instructions that are used to be interpreted by the interpreter, and the native instructions corresponding to the intermediate instructions that are used to be interpreted by the interpreter comprise the native instruction of the function.

22. The non-transitory computer-readable medium of claim 20, wherein the language virtual machine comprises a just-in-time compiler, the native instruction space of the function is used to store native code of the function, the native instruction of the function is an instruction in the native code of the function, and the native code of the function is obtained by means of compilation by the just-in-time compiler.

* * * * *

UNITED STATES PATENT AND TRADEMARK OFFICE
CERTIFICATE OF CORRECTION

PATENT NO. : 10,871,976 B2
APPLICATION NO. : 15/995555
DATED : December 22, 2020
INVENTOR(S) : Yi et al.

Page 1 of 1

It is certified that error appears in the above-identified patent and that said Letters Patent is hereby corrected as shown below:

On the Title Page

Item (71), in Column 1, in "Applicant", Line 2, delete "Guangdong" and insert -- Shenzhen, Guangdong --, therefor.

Item (73), in Column 1, in "Assignee", Line 1, delete "CO," and insert -- CO., --, therefor.

Item (56), in Column 2, under "Other Publications", Line 2, delete "Architecure" and insert -- Architecture --, therefor.

On Page 2, Item (56), in Column 2, under "Other Publications", Line 35, delete "PCT/CN2016/2016/096068." and insert -- PCT/CN2016/096068. --, therefor.

In the Claims

In Column 29, in Claim 17, Line 62, delete "the processor and the memory" and insert -- a processor and a memory --, therefor.

In Column 30, in Claim 18, Line 7, delete "the processor and the memory" and insert -- a processor and a memory --, therefor.

Signed and Sealed this
Third Day of September, 2024

Katherine Kelly Vidal
*Director of the United States Patent and Trademark Office*